(12) United States Patent
Durben et al.

(10) Patent No.: US 9,004,414 B2
(45) Date of Patent: Apr. 14, 2015

(54) FLEXIBLE SECURING DEVICE

(76) Inventors: David P. Durben, Anaheim, CA (US);
Dianne S. Durben, Anaheim, CA (US)

(*) Notice: Subject to any disclaimer, the term of this patent is extended or adjusted under 35 U.S.C. 154(b) by 229 days.

(21) Appl. No.: 13/367,680

(22) Filed: Feb. 7, 2012

(65) Prior Publication Data
US 2012/0198680 A1 Aug. 9, 2012

Related U.S. Application Data

(60) Provisional application No. 61/440,770, filed on Feb. 8, 2011.

(51) Int. Cl.
| | |
|---|---|
| *F16L 3/00* | (2006.01) |
| *F16G 11/00* | (2006.01) |
| *A47G 25/08* | (2006.01) |
| *A47G 25/10* | (2006.01) |
| *A47G 29/08* | (2006.01) |
| *F21V 21/088* | (2006.01) |
| *F21V 21/096* | (2006.01) |
| *F16L 3/02* | (2006.01) |
| *F16L 3/12* | (2006.01) |
| *F21S 4/00* | (2006.01) |
| *H01F 7/02* | (2006.01) |

(52) U.S. Cl.
CPC ............ *F16G 11/00* (2013.01); *A47G 25/08* (2013.01); *A47G 25/10* (2013.01); *A47G 29/083* (2013.01); *F21V 21/088* (2013.01); *F21V 21/096* (2013.01); *F16L 3/02* (2013.01); *F16L 3/1218* (2013.01); *F21S 4/001* (2013.01); *H01F 7/0263* (2013.01)

(58) Field of Classification Search
CPC ........ F16L 3/1233; F16L 33/03; B65D 63/02; B65D 2519/00024; B65D 71/02; H01F 7/0252; H01F 7/0263; A44C 5/0053
USPC ............. 24/20 R, 23 EE, 20 EE, 30.5 T, 303, 24/265 A; 248/683, 60, 74.3, 206.5, 274.1, 248/300, 301
See application file for complete search history.

(56) References Cited

U.S. PATENT DOCUMENTS

| | | | | |
|---|---|---|---|---|
| 1,230,019 | A * | 6/1917 | Patton | 138/99 |
| 2,466,912 | A * | 4/1949 | Frederick | 248/74.3 |
| 2,832,115 | A * | 4/1958 | Schindler | 24/20 R |
| 3,159,708 | A * | 12/1964 | Deal | 174/40 CC |
| 3,278,148 | A * | 10/1966 | Denaro | 248/210 |
| 3,909,979 | A * | 10/1975 | Perez | 47/55 |
| 5,509,632 | A * | 4/1996 | Mesna et al. | 248/301 |
| 5,647,563 | A * | 7/1997 | Gantner et al. | 248/74.1 |
| 5,762,306 | A * | 6/1998 | Day | 248/274.1 |
| 6,073,896 | A * | 6/2000 | McFadden | 248/231.81 |
| 6,311,371 | B1 * | 11/2001 | Dazzo | 24/20 R |
| 6,397,854 | B1 * | 6/2002 | Bailey | 132/200 |

(Continued)

*Primary Examiner* — Bradley Duckworth
(74) *Attorney, Agent, or Firm* — K&L Gates LLP; Louis C. Cullman; Georgia N. Kefallinos (57) ABSTRACT

Described herein generally are flexible securing devices. The devices are extremely easy to use to the point that adults of all ages can use the devices, even the most elderly who would otherwise be incapable. The devices comprise a body which is at least partially bendable or flexible. The body's core generally comprises a metal alloy and in the body's bendable or flexible sections a bendable or flexible metal alloy is used. The body is coated with a least one polymeric coating to protect items, objects or persons interacting with the securing devices from getting damaged or injured from the devices themselves.

9 Claims, 7 Drawing Sheets

(56) References Cited

U.S. PATENT DOCUMENTS

| | | | |
|---|---|---|---|
| 6,467,132 B1 * | 10/2002 | Robley | 24/16 PB |
| 6,622,346 B2 * | 9/2003 | Graham et al. | 24/16 R |
| 6,918,161 B2 * | 7/2005 | Gyongyosi | 24/20 S |
| 7,013,534 B2 * | 3/2006 | Nagano | 24/20 R |
| 7,083,151 B2 * | 8/2006 | Rapp | 248/60 |
| 7,481,404 B2 * | 1/2009 | Carnevali | 248/160 |
| 7,640,632 B2 * | 1/2010 | Lazarus | 24/17 B |
| 8,387,216 B1 * | 3/2013 | Martinson | 24/30.5 T |
| 8,469,322 B1 * | 6/2013 | Oxley | 248/74.2 |
| 2002/0073513 A1 * | 6/2002 | Tanaka | 24/20 R |
| 2004/0104320 A1 * | 6/2004 | Exler | 248/206.5 |
| 2005/0262666 A1 * | 12/2005 | McIntosh | 24/5 |
| 2006/0152927 A1 * | 7/2006 | Vendrick | 362/249 |
| 2010/0118554 A1 * | 5/2010 | Kraus et al. | 362/396 |
| 2011/0056437 A1 * | 3/2011 | Sprung | 119/51.04 |
| 2011/0252607 A1 * | 10/2011 | Rothbaum et al. | 24/303 |
| 2011/0308049 A1 * | 12/2011 | Sun | 24/306 |
| 2012/0104187 A1 * | 5/2012 | Kramer | 248/74.3 |
| 2012/0266419 A1 * | 10/2012 | Browne et al. | 24/20 EE |

\* cited by examiner

FIG. 17

FLEXIBLE SECURING DEVICE

CROSS REFERENCE TO RELATED APPLICATIONS

This application claims benefit of priority under 35 U.S.C. §119(e) from U.S. Provisional Application Ser. No. 61/440,770, filed on Feb. 8, 2011, which is hereby incorporated by reference in its entirety.

FIELD OF THE INVENTION

The present invention relates to flexible securing devices and methods of using the same for a variety of household and industrial applications.

BACKGROUND

Organization is vital to the lives of many people. A plethora of products exist on the market today which attempt to assist in organizing our lives. From computer software to automobile accessories to fitness equipment that can be hung in the closet after use, all products attempt to organize our lives to some extent. However, it seems that the more a product claims to organize our life, the more complex and cumbersome it is to use.

As such, there is a need in the art for simple, easy to use products that can aid in organizing our lives and making us more productive at the same time. The securing devices of the present description set out to do just that.

SUMMARY

Described herein are flexible securing devices used to secure objects to one another, to an external object, to an anchoring object or the like. The securing devices can also simply secure to an object. The devices described herein aid in both organization and productivity, and are easy to use. Adults of all ages can use the devices, even the most elderly.

Methods of making and using the devices are also described. The securing devices generally comprise a body formed of a metal alloy comprising a first side, a second side, the body at least partially formed of a bendable metal alloy, and the body covered with a coating material. In some embodiments, the coating material is a polymeric material, a natural fabric or a synthetic fabric.

In one embodiment, the first side has a first magnetic charge and the second side has a second magnetic charge. In other embodiments, the first magnetic charge and the second magnetic charge are opposite thereby attracting each other.

Further, in another embodiment, the first side and the second side are coupled thereby securing the flexible securing device to an external object. In other embodiments, the bendable metal alloy portion of the body secures an external object.

The flexible securing devices further comprise, in other embodiments, at least two appendages at a first end of the body. The device can further comprise one appendage at a second end of the device. In some embodiments, the body comprises up to and including eight appendages.

In still other embodiments, the body is elongated having a first end and a second end wherein the body comprises protruding appendages only on one side of the body between the first end and the second end. In another embodiment, the body is elongated having a first end and a second end wherein the body comprises protruding appendages on both sides of the body between the first end and the second end.

Further described herein are methods of using the flexible securing devices described. Generally, methods of securing an external object comprise providing an elongated device having a body formed of a metal alloy comprising a first side, a second side, a first end and a second end, the body at least partially formed of a bendable metal alloy, and the body coated with a polymeric material; providing the external object; conforming the elongated device around the external object from an original position to a securing position wherein the first end surpasses the second end and the first surface can lay atop the second surface; and securing the external object.

In one embodiment, the first surface and the second surface are magnetically attracted. In other embodiments, the elongated device is bendable back from the securing position back to the original position. Further still, the external object is a bundle of wires, a coiled hose, automotive hoses, or a package.

Even further still, the methods include securing an external object to a stationary object comprising providing an elongated device having a body formed of a metal alloy comprising a first end and a second end, the body at least partially formed of a bendable metal alloy, and the body coated with a polymeric material; providing the external object; determining a position on the stationary object where the external object is to be secured; bending the first end of the elongated device around at least a portion of the stationary object thereby securing the elongated device to the stationary object; wrapping the second end of the an elongated device around the external object from an original position to a securing position wherein the external object is held in place adjacent to the stationery abject; and securing the external object to the stationary object.

In one embodiment, the first end of the elongated device comprises at least two appendages. Further, in another embodiment, the second end of the elongated device is an appendage.

In other embodiments, the stationary object is a tree, pole, rain gutter, bush, piece of furniture, automobile, maritime vessel, holiday tree, a wall hook, clothes line or portion of house exterior. In still other embodiments, the external object is a holiday decoration, holiday ornament, a key a set of keys, article of clothing, a wire, a loom of wires, a coiled hose, automotive hoses, or a package.

DETAILED DESCRIPTION

Described herein generally are flexible or partially flexible securing devices. The devices aid in organization and productivity in that they generally aid in everyday household functions. Further, the devices can be used on an industrial scale to save both time and money. The devices are extremely easy to use to the point that adults of all ages can use the devices, even the most elderly who would otherwise be incapable.

The devices comprise a body which is at least partially bendable or flexible. The body's core generally comprises a metal alloy and in the body's bendable or flexible sections a bendable or flexible metal alloy is used. The body is covered and/or coated with a least one polymeric and/or fabric coating to protect items, objects or persons interacting with the securing devices from getting damaged or injured from the devices themselves.

Figure 1:
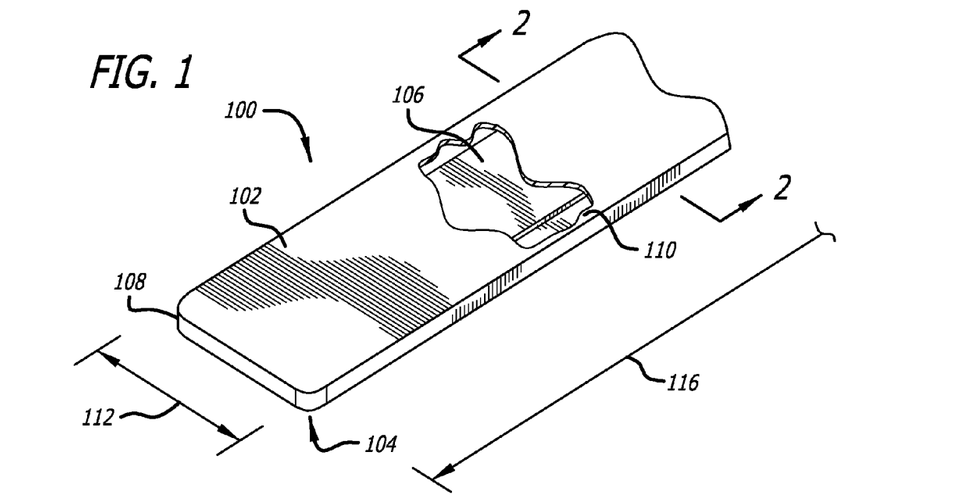
FIG. 1 illustrates a perspective view of a portion of a flexible securing device according to the present description.
Figure 2:
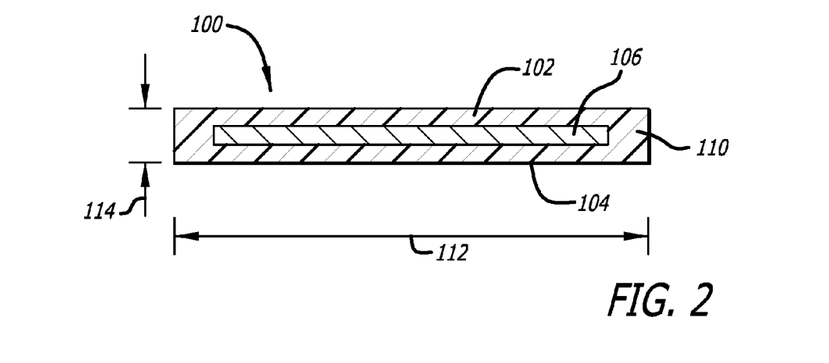
FIG. 2 is a cross-sectional view of the flexible securing device illustrated in FIG. 1.

Illustrated in FIGS. 1 and 2 is a securing device 100. Securing device 100 includes first side 102 and second side 104. At the core of securing device 100 is metal alloy 106 that extends through the core from first end 108 to a second end (not illustrated). Metal alloy 106 is coated with polymeric material 110 which can have a uniform thickness around the entire metal alloy or any portion thereof. In other embodiments, polymeric material 110 does not have a uniform thickness; rather the thickness can be varied depending on the securing device's particular application.

In some embodiments, polymeric material 110 can be replaced with a fabric coating or covering. The fabric can be natural, synthetic or both. In some embodiments, the fabric can be made of wool or cotton. Polymeric fabrics can also be used to loosely or tightly cover metal alloy 106 as opposed to coating the metal alloy.

Portions of metal alloy 106 can be rigid and non-flexible. Metals appropriate for rigid alloys can be selected from the group consisting of alkaline metals, alkaline earth metals, lanthanides, actinides, transition metals and other metals found in the periodic chart. More specifically, metals such as, but not limited to iron, aluminum, nickel, lead, zinc, gold, silver, copper, tantalum, platinum, titanium, rhodium, palladium, ruthenium, osmium, iridium and alloys thereof can be used to form metal alloy 106. It is useful to note that metal alloy 106 can in fact be a single type of metal.

Other portions of metal alloy 106 can be bendable and/or flexible. Metals with a high ductility value and/or a high malleability value are desired. Such flexible and/or bendable metals and metal alloys with desired ductility and/or malleability properties can be formed of at least one of gold, silver, lead, tin, platinum, zinc, iron, aluminum, copper, and steel. However, virtually any metal in the right alloys can be made to have the ductility and/or malleability to be flexible and can include amounts of the above mentioned metals. In some embodiments, the metal is free of lead.

Polymeric material 110 can be formed of any non-degradable polymeric material known in the art. Such polymers include rubber, synthetic rubber, silicone polymers, thermoplstics, thermosets, polyolefins, polyisobutylene, acrylic polymers, ethylene-co-vinylacetate, polybutylmethacrylate, vinyl halide polymers (for example, polyvinyl chloride), polyvinyl ethers (for example, polyvinyl methyl ether), polyvinylidene halides, polyacrylonitrile, polyvinyl ketones, polyvinyl aromatics, polyvinyl esters, acrylonitrile-styrene copolymers, ABS resins, ethylene-vinyl acetate copolymers, polyamides (for example, Nylon 66 and polycaprolactam), alkyd resins, polycarbonates, polyoxymethylenes, polyimides, polyethers, epoxy resins, polyurethanes, rayon, cellulose, cellulose acetate, cellulose butyrate, cellulose acetate butyrate, cellophane, cellulose nitrate, cellulose propionate, cellulose ethers, carboxymethyl cellulose, polytetrafluororethylene (for example, Teflon) and combinations thereof.

Securing device 100 has a width 112, a thickness 114 and a length 116 all of which can be varied depending again on the securing device's particular application. Width 112 can be from about 1 mm to about 12 inches, or from about 1 mm to about 5 mm, or from about 0.5 inches to about 2 inches. Thickness 114 can be from about 0.001 inches to about 0.25 inches, or from about 0.001 inches to about 0.1 inches, or from about 0.01 inches to about 0.1 inches. Length 116 can be the most variable dimension and can range from about 0.5 inches to about 100 feet, or from about 0.5 inches to about 10 feet, or about 0.5 inches to about 1 foot, or from about 0.5 inches to about 6 inches or less.

In some embodiments, the shape of a securing member as described herein can be varied by either changing the shape of the metal alloy, the shape of the polymeric coating or both. For example, securing device 100 is generally flat in shape. However, it is within the scope of the present disclosure that any portion of a securing device can have shapes such as tubular, rectangular, square, trapezoidal, or the like. In other words, securing devices need not always have a flat profile.

Figure 3:
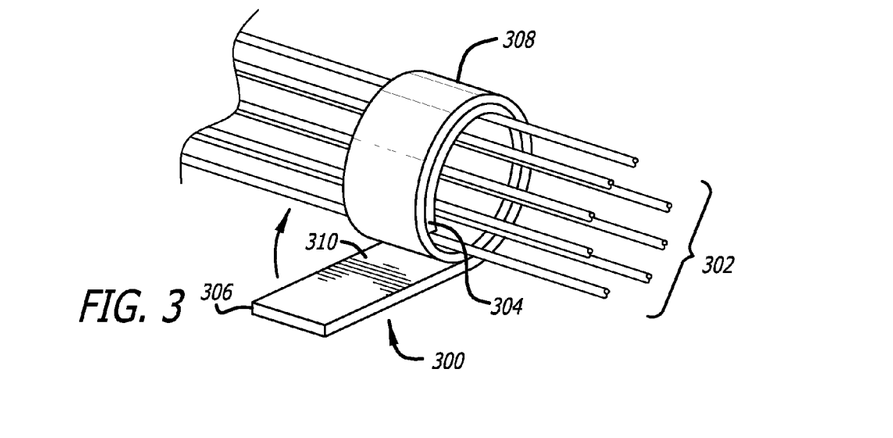
FIG. 3 illustrates the flexible securing device illustrated in FIG. 1 used to secure a bundle of wires.

For example, in one embodiment illustrated in FIG. 3, securing device 300 is used to secure a loom of wires 302. Securing device 300 comprises first end 304 and second end 306 as well as first side 308 and second side 310. In one exemplary embodiment, first side 308 has a first charge and second side 310 has a second charge. The first and second charges can be opposite so that they attract each other when in close proximity. The charge can be magnetic, electrical or the like. Preferably, the charge is magnetic.

In other embodiments, first side 308 and second side 310 comprise coatings that can mate with one another. For example, first side 308 can have fabric hooks and second side 310 can have fabric looms a configuration that is commonly known as VELCRO®. Upon touching first side 308 and second side 310, the two sides will be come connected until such time as the two sides are pulled apart.

In another example, first side 308 can have an adhesive applied and second side 310 can be bare. Upon touching of first side 308 and second side 310, they will stick together. The opposite can also exist where first side 308 is bare and second side 310 includes an adhesive coating. Also both first side 308 and second side 310 can have an adhesive coating.

By securing the loom of wires using a securing device as described, there exist no extra and/or dangling tie components. Rather the securing devices described herein neatly secure a loom of wires or other comparable set of objects. Other comparable objects can include pipes, flower stems (for example, to hold a bouquet of flowers together), rolled up documents (for example, architectural documents), rebar (for example, in construction), and the like.

In another embodiment, securing device 100 can be used to hold clothes to a line, for example, to dry. Securing device 100 can be folded over a clothesline and used to hold up one or more pieces of clothing. In such an embodiment, first side 308 can be magnetized with a first charge along about half of its length and with a second opposite charge along the other half of its length. The opposing charges allow first end 304 and second end 306 to be attracted to each other, thereby providing extra strength for holding up potentially wet clothing. The fact that securing device 100 is coated preferably with polymeric material 110 prevents rusting of metal alloy 106.

Securing device 100 can be of any suitable color or combination of colors. For example, yellow might be a desired color if the securing device needs to be easy to spot. The color can be tailored to match a particular use environment. For example, if securing device 100 is to be used to attach an object to a tree, a shade of brown may be desired or if it is to be wrapped around a black pole, a black coating may be desired. Further, colors can be used to indicate what exactly is being wrapped. For example, if gas lines are being wrapped, yellow might indicate gas whereas if water lines are being wrapped, blue (for cold) and red (for hot) might be an appropriate. Purple for reclaimed water can also be appropriate.

In other embodiments, combinations of colors may be desired. For example, if first side 308 and second side 310 are opposing magnetic charges, perhaps first side 308 is colored green and second side 310 is colored red.

In other embodiments, for example when securing device 100 is used as a fashion accessory, stripes, prints and patterns can be applied to the device to match a particular style. Further in the interest of style, securing device 100 can further be coated with, or include on the surface, beads, gems, crystals, precious metals or the like. In one exemplary embodiment, Swarovski crystals are added to the device to provide style.

Further, securing device 100 can be embedded with or have printed thereon a company picture or logo, or can be customized as desired by a user. For example, a company name can be printed directly on the polymeric coating using the silkscreening process. Font size, color, and shape can all be customized by the user.

Further still, securing device 100 can have various textures applied to the surface. A rough texture can be useful to grip the securing device while a smooth texture can be useful with clothing to prevent destroying the fabric. Virtually any texture can be applied or formed into the polymeric coating. In some embodiments, only one side is textured, or only a particular portion of a side is textured. For example, only the ends are textured in one embodiment to aid in grasping the devices.

In another embodiment, securing device can be used in theater and feature film production in both stage and costume design. Securing device 100 can be used to provide particular shapes in clothing or lightweight stage or set elements. Securing device 100 can be made light weight such that a costume incorporating such technology would be lighter than one formed or rigid wire and cotton stuffing. In more simple clothing embodiments, securing device 100 can simply be shaped as a collar stay to secure a collar in a particular configuration. Unlike common stays made of plastic which once they are bent, they are ruined, securing device 100 can be bend back into place once it has been deformed. The polymeric coating covering securing devices can be polytetrafluoroethylene preventing the securing members from sticking to clothing and making them laundry safe.

In another embodiment, one or more securing devices can be used to configure a drawer into compartments. Securing devices can be bent to desired angles to create custom shaped and sized drawer compartments. Different heights and lengths of securing members can be used. Such an embodiment would make drawer configuration almost completely customizable thereby aiding in organization.

Further still, in another embodiment, a securing device can be folded back upon itself in a wedge shape leaving a slight overlap thereby creating a doorstop that can be wedged under a door. A simple way of doing this would be to bend a flat one foot long securing device at about the six inch mark to a 45 degree angle relative to the remainder of the securing device. Then another 45 degree fold at about the nine inch point back to and touching the remainder of the securing device creates a doorstop. In other embodiments, a rolled doorstop or a larger circular door stop might be desired.

In other embodiments, securing devise as described herein can be used in the packaging industry. For example, securing devices can be used to package children's toys. Commonly, children's toys are held to the packaging using several tedious and aggravating ties. The securing devices described herein can be used to hold the toys in place and then can be easily removed by the purchaser thereby avoiding headaches cause by current packaging techniques. In such embodiments, the width and thickness of the securing devices would be about 2 mm to about 3 mm and the length would depend on the product being packaged.

In yet other embodiments, the securing devices described herein can be used as wine racks. The simplest configuration would be to wrap the securing device around each bottle and then just stack them to prevent damage to the bottles. In other embodiments, much like the drawer organizers, securing devices can be customized to created a custom wine rack to fit within virtually any space.

Figure 4:
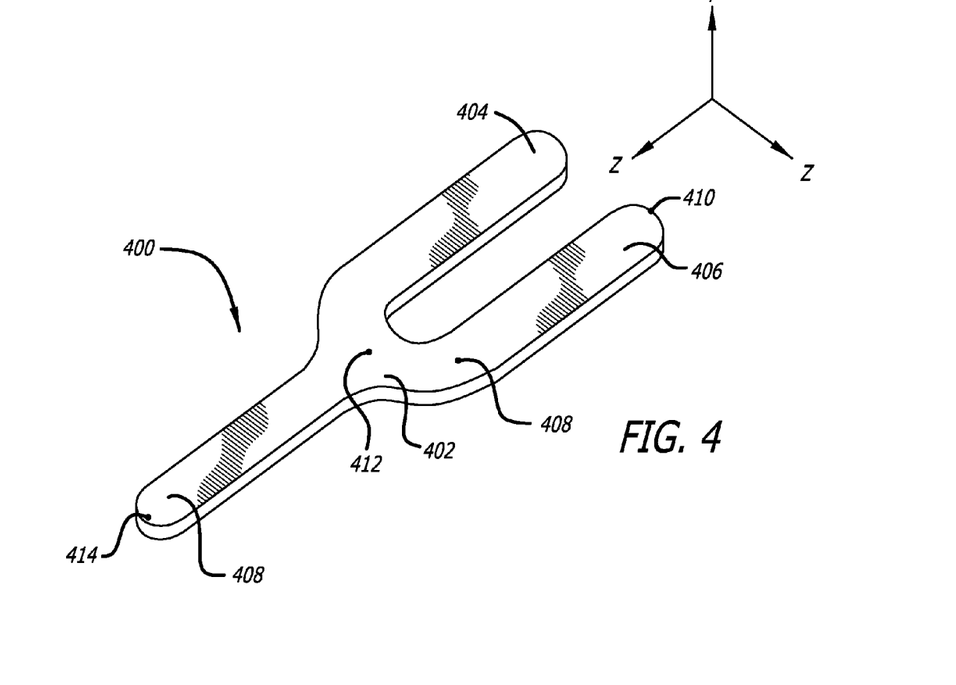
FIG. 4 illustrates another flexible securing device according to the present description.
Figure 5:
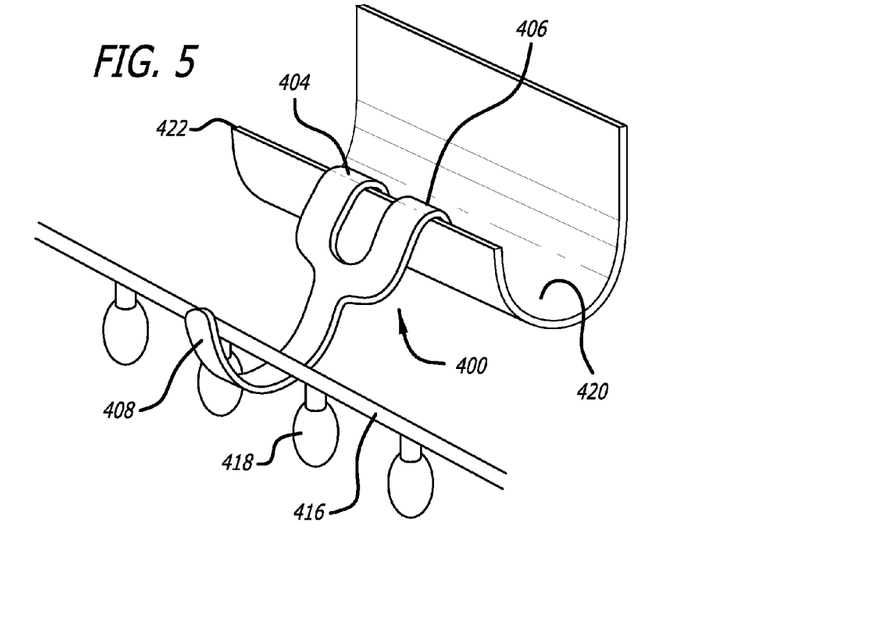
FIG. 5 illustrates the flexible securing device illustrated in FIG. 4 used to secure holiday lights.
Figure 6:
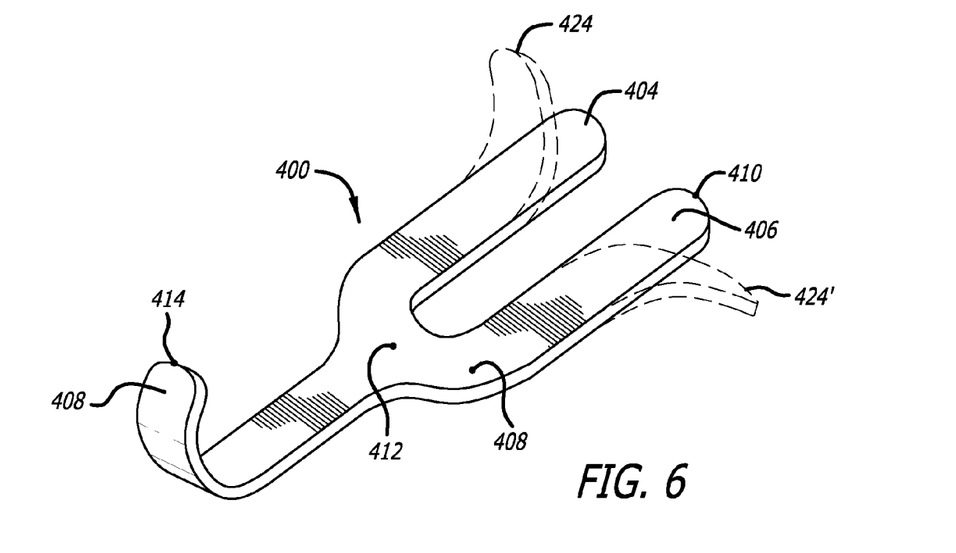
FIG. 6 is an additional embodiment of the flexible securing device illustrated in FIG. 4 wherein one appendage is rigid while the other two remain flexible.

Referring back to the figures, another exemplary embodiment is illustrated in FIGS. 4, 5 and 6. FIG. 4 illustrates securing device 400 having body portion 402, first appendage 404, second appendage 406 and third appendage 408. First appendage 404, second appendage 406 and third appendage 408 in the un-flexed position run parallel in both the y and z plane. First appendage 404 and second appendage 406 reside adjacent to each other at about 1 inch apart. In other embodiments, first appendage 404 and second appendage 406 reside about 0.5 inches, 0.75 inches, 1.5 inches, 2 inches, 2.5 inches, 3 inches, 3.5 inches, or 5 inches apart. Third appendage 408 is situated opposite first appendage 404 and second appendage 406. First appendage 404 and second appendage 406 can be the same length or on different lengths. First appendage 404 and second appendage 406 can each independently be of a length, measured from appendage origin point 408 to appendage termination point 410, of about 1 inch, 2 inches, 3 inches, 4 inches, 5 inches, 6 inches, 7 inches, 8 inches, 9 inches, 10 inches, 11 inches, 12 inches, 14 inches, 16 inches, 18 inches or more. Third appendage can be of a length, measured from body center point 412 to end point 414, of about 1 inch, 2 inches, 3 inches, 4 inches, 5 inches, 6 inches, 7 inches, 8 inches, 9 inches, 10 inches, 11 inches, 12 inches, 14 inches, 16 inches, 18 inches or more. As with securing member 100, securing member 400 has a flexible metal alloy core coated with a polymeric material and is generally flat.

Securing member 400 can be used to hang decorations, for example, but not limited to holiday lights. The holiday decorations can be attached to an anchorable and/or stationary external object using a securing device as described. As illustrated in FIG. 5, holiday light strand 416 including multiple lights 418 is hung from an external object, in the embodiment gutter 420. First appendage 404 and second appendage 406 are bent over edge 422 of gutter 418 thereby attaching securing device 400 to gutter 420. Third appendage 408 is bent upward and around holiday light strand 416 thereby securing the holiday light strand to the external object.

In some embodiments, first appendage 404 and second appendage 406 can be magnetically charged thereby further anchoring securing device 400 to a metal gutter or otherwise metal external object.

Further, as illustrated in FIG. 6, securing device 400 has flexible first appendage 404 and second appendage 406. However, third appendage 408 is rigid shaped as a hook. In such an embodiment, securing device 400 can be attached to an external object using first appendage 404 and second appendage 406 by flexing 424,424' them over or around the external object. Once secured to an external object, appendage 408 can act as a rigid hook. In one exemplary embodiment, the securing device illustrated in FIG. 6 can be used as a hooking device over the top of a door. First appendage 404 and second appendage 406 can be bent over the top of a door and third appendage 408 draped down the back of the door to hook, for example, a robe or towel.

Figure 7:
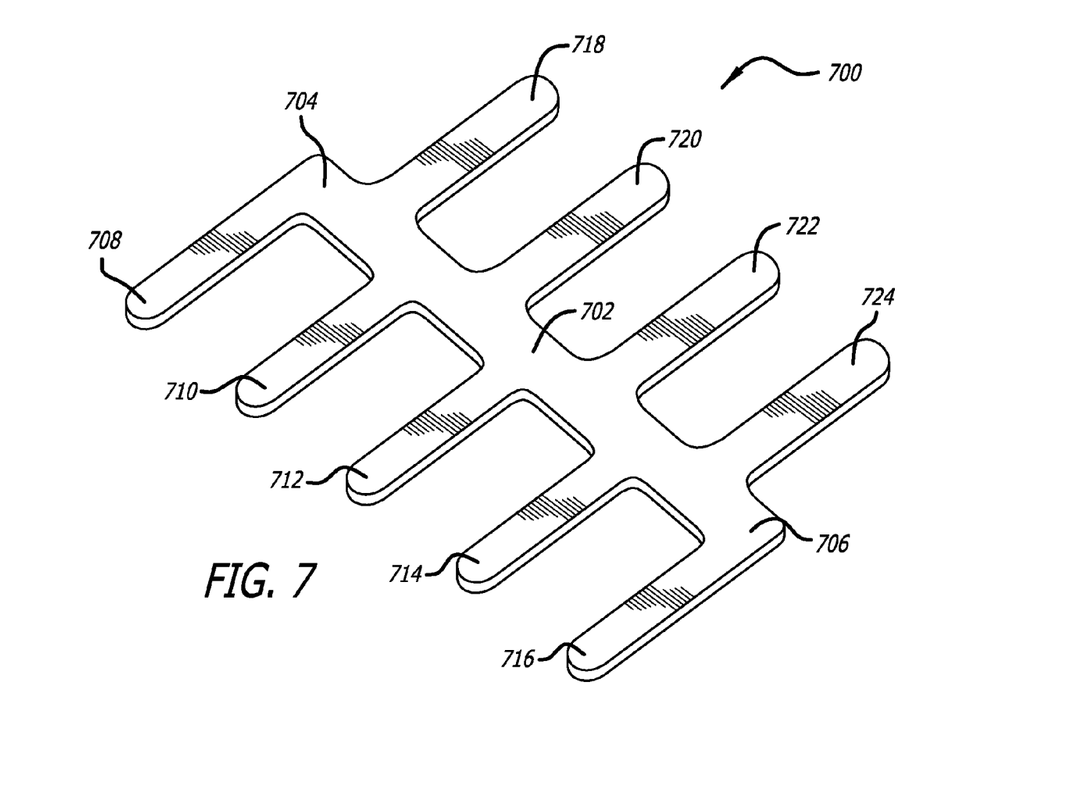
FIG. 7 illustrates another flexible securing device according to the present description.

Another embodiment is illustrated in FIG. 7. Securing device 700 comprises elongated body member 702 having first end 704 and second end 706. Emanating from elongated body member 702 are at least two appendages from each side. For the securing member embodiment illustrated in FIG. 7, left side of elongated body member 702 comprises first appendage 708, second appendage 710, third appendage 712, fourth appendage 714, and fifth appendage 716. The right side of elongated body member 702 comprises sixth appendage 718, seventh appendage 720, eight appendage 722 and ninth appendage 724. Each opposing appendage is halfway offset between opposite appendages. For example, sixth appendage 718 originates half way between first appendage 708 and second appendage 710. In other embodiments, different spacing can be used. For example, opposing appendages can originate from the same location on elongated body member 702. In other embodiments, multiple appendages can be located between two opposing appendages. Any conceivable combination of appendages emanating from elongated body member 702 is within the scope of the present specification. In one embodiment, the arrangement of appendages maximizes structural integrity of the securing device.

In some embodiments, the entirety of securing member 700 is flexible. In other embodiments, portions of securing member 700 are rigid. For example, elongated body member 702 can be rigid while each appendage is flexible. In another embodiment, elongated body member 702 is rigid and first appendage 708, second appendage 710, third appendage 712, fourth appendage 714, and fifth appendage 716 are all rigid and in a hook shape.

Figure 8:
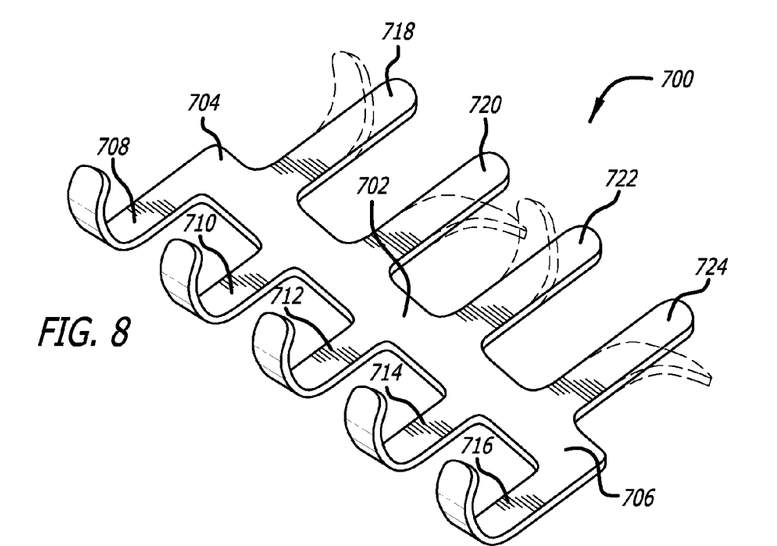
FIG. 8 is an additional embodiment of the flexible securing device illustrated in FIG. 7 wherein several appendages are rigid while the others remain flexible.

For example, in FIG. 8, sixth appendage 718, seventh appendage 720, eight appendage 722 and ninth appendage 724 are flexible, while first appendage 708, second appendage 710, third appendage 712, fourth appendage 714, and fifth appendage 716 are rigid hooks. In such an embodiment, sixth appendage 718, seventh appendage 720, eight appendage 722 and ninth appendage 724 can be wrapped around an external object such as a cylindrical object or bent around other, differently shaped external objects.

Figure 9:
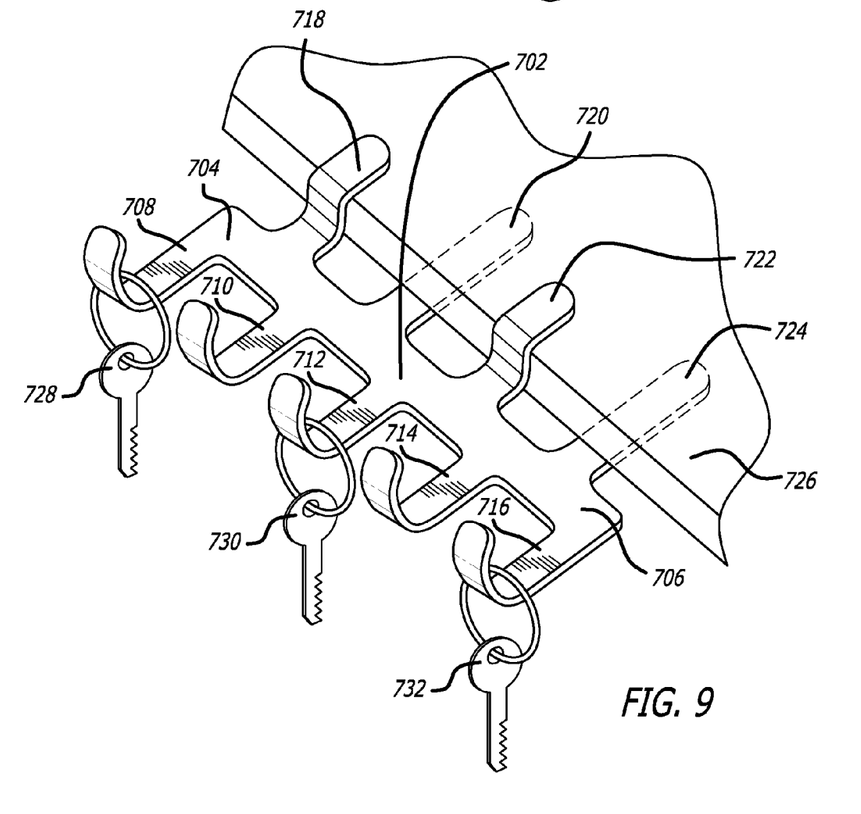
FIG. 9 illustrates the flexible securing device illustrated in FIG. 7 used to secure objects (for example, keys) to an external object (for example, a tabletop).

FIG. 9 illustrates securing member 700 wherein first appendage 708, second appendage 710, third appendage 712, fourth appendage 714, and fifth appendage 716 are all bent into hook configurations. Meanwhile, sixth appendage 718 and eight appendage 722 are bent up and around external object 726 and seventh appendage 720 and ninth appendage 724 are allow to rest under external object 726. In such an embodiment, external object can be a table top or even a counter. The hooks formed from first appendage 708, second appendage 710, third appendage 712, fourth appendage 714, and fifth appendage 716 can be used to either secure additional object(s) to external object 726 or other wise store object(s). For example in FIG. 9, securing device 700 is holding first key 728, second key 730 and third key 732 on first appendage 708, third appendage 712 and fifth appendage 716 respectively.

In other embodiments, instead of keys, other objects such as towels, clothes (for example, a robe), jewelry (for example, a necklace), identification badges, bags (for example, a purse), hats, and the like can be hung from the first appendage 708, second appendage 710, third appendage 712, fourth appendage 714, and fifth appendage 716.

Figures 10, 11, 12:
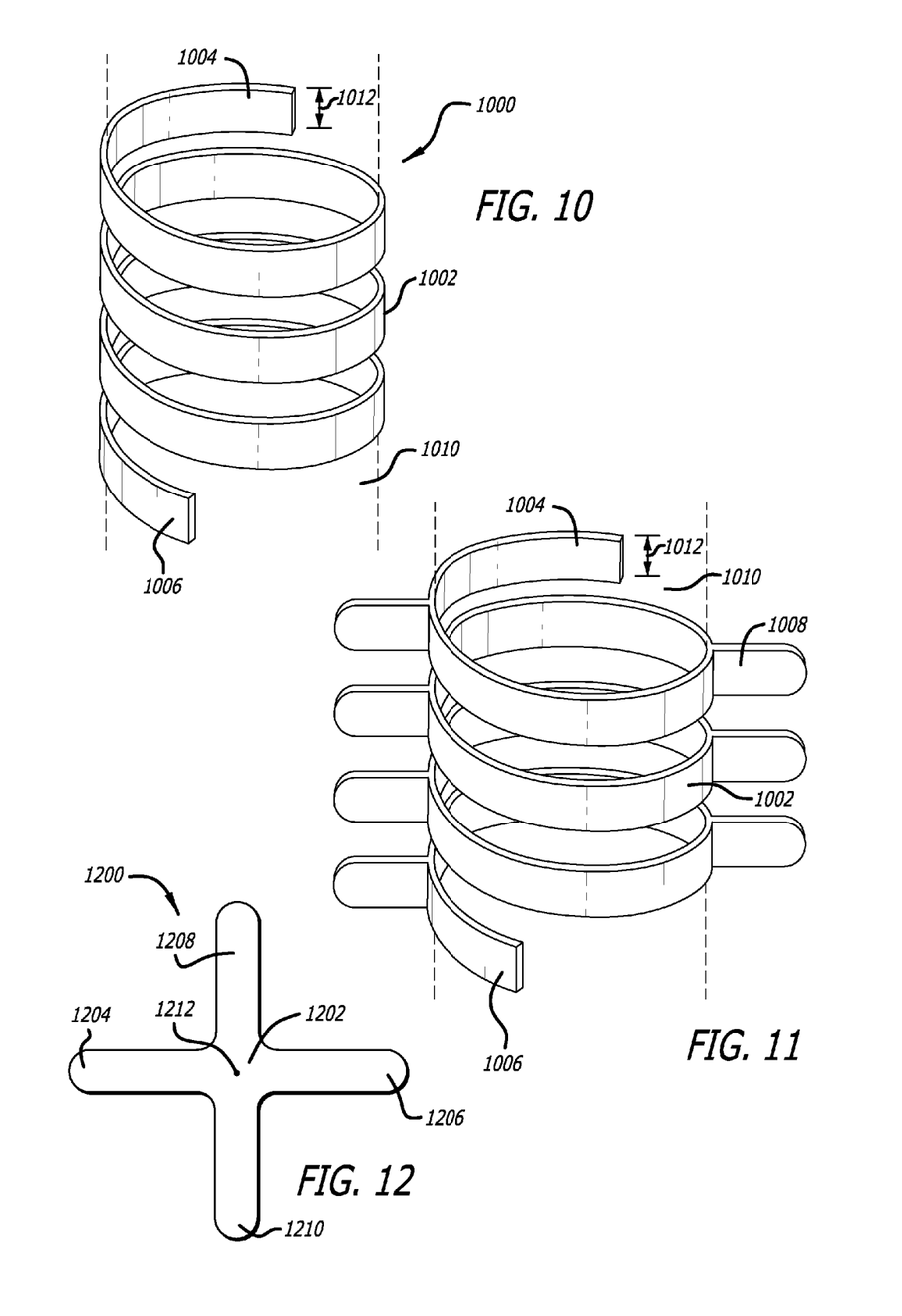
FIG. 10 illustrates another flexible securing device according to the present description wherein the securing device assumes the shape of a coil.
FIG. 11 illustrates another embodiment of the flexible securing device illustrated in FIG. 10 with appendages.
FIG. 12 illustrates another flexible securing device according to the present description in a plus configuration.

FIG. 10 illustrates a securing device 1000 comprising a long think body 1002, a first end 1004 and a second end 1006. Securing device 1000 can be coiled around virtually any cylindrical object. Further, securing device 1000 can even be coiled around objects that are not cylindrical, for example, the objects can be square, triangular, trapezoidal, or the like. Body 1002 is flexible allowing for various configurations of securing device 1000.

Securing device 1000, as illustrated in FIG. 11, can have one or more appendages 1008 emanating from body 1002. Appendages 1008 can be used to secure one or more objects (not illustrated) to anchoring object 1010. For example, anchoring object 1010 could be a tree trunk or limb and one or more objects secured by appendages 1008 could be holiday decorations (for example, holiday light strands).

In other embodiments, appendages 1008 are not required. For example, the one or more objects to be secured to anchoring object 1010 can be held adjacent to anchoring object 1010 and then securing device 1000 can be coiled around both objects thereby holding one or more objects to anchoring object 1010.

The length and width 1012 of securing device 1000 will depend on such things as the amount of weight it is to hold up, the diameter of the object it is to coil around, and the like. For example, when the diameter of anchoring object 1010 is small and a light object is to be secured thereto, a relatively short securing device 1000 can be used. In contrast, when the diameter of anchoring object is relatively large and/or a heavy object is to be secured, a relatively long and/or think securing device 1000 can be used.

Figure 13:
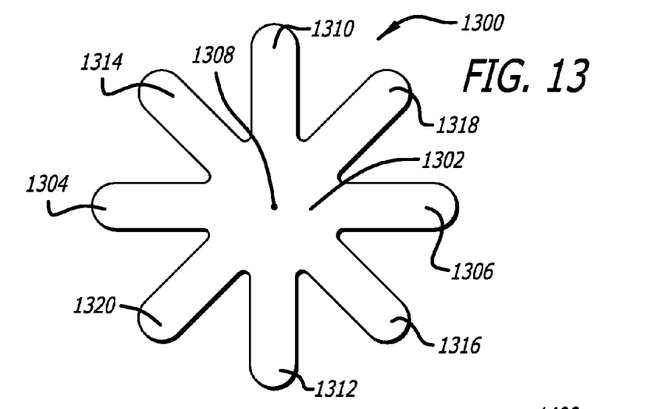
FIG. 13 illustrates another flexible securing device according to the present description in a star configuration.

Two additional exemplary embodiments are illustrated in FIGS. 12 and 13. In FIG. 12, securing device 1200 includes elongated body portion 1202 having a first end 1204 and a second end 1206. Securing device 1200 includes first appendage 1208 and second appendage 1210 originating at elongated body portion center point 1212. In one embodiment, the length from center point 1212 to first end 1204 and second end 1206 is the same length as first appendage 1208 and second appendage 1210. In other words, all four protrusions from center point 1212 are the same length.

Similarly, in FIG. 13, securing device 1300 is illustrated including elongated body portion 1302 having a first end 1304 and a second end 1306 and center point 1308. Securing device 1300 further includes first appendage 1310 and second appendage 1312 originating at center point 1308 and protruding perpendicularly from elongated body portion 1302. Further still, securing device includes first angular member 1314, second angular member 1316, third angular member 1318, and forth angular member 1320 all of which protrude at 45 degree angles from a respective adjacent appendage or end. In one embodiment, the length from center point 1308 to first end 1304 and second end 1306 is the same length as first appendage 1310, second appendage 1312, first angular member 1314, second angular member 1316, third angular member 1318, and forth angular member 1320. In other words, all eight protrusions from center point 1308 are the same length.

In other embodiments of FIGS. 12 and 13, each protrusion or end can be a unique length or pair can be of similar length depending on the particular application for the securing device. Further, each end and/or appendage can independently be flexible or rigid depending on the application. It is further envisioned that virtually an number of appendages can be added to a securing device as needed for a particular application. For example, a securing device can have eight, ten, twelve, fourteen sixteen, eighteen or even twenty of more appendages. It is also conceivable that an odd number of appendages be used.

For example, securing devices 1200 and 1300 can be used to protect items like dishes or pots and pans or can even be used to hang a plate on the wall. For protection, securing device 1200 can be placed on top of the plate such that the center of the plate is centered on center point 1212. Then, first end 1204, second end 1206, first appendage 1208 and second appendage 1210 are wrapped around the edge of the plate. Once another plate is placed atop of a protected plate, the two plates do not touch one another.

Likewise, securing device 1300 can be placed on top of the plate such that the center of the plate is centered on center point 1308. Then, first end 1304, second end 1306, first appendage 1310, second appendage 1312, first angular member 1314, second angular member 1316, third angular member 1318, and forth angular member 1320 are wrapped around the edge of the plate. Again, once another plate is placed atop of a protected plate, the two plates do not touch one another.

To hang a plate on a wall, for example, securing device 1200 or 1300 can be nailed or screwed to a wall through the center point of either securing device 1200 or 1300. After that point, the center point of the plate is placed over the center point of the securing device and the ends and appendages are wrapped around the plate from the back to the front thereby hold the plate against the wall. In some embodiments, screw or nail holes are already predrilled into securing devices not requiring a user to self-tap the holes.

Figure 14:
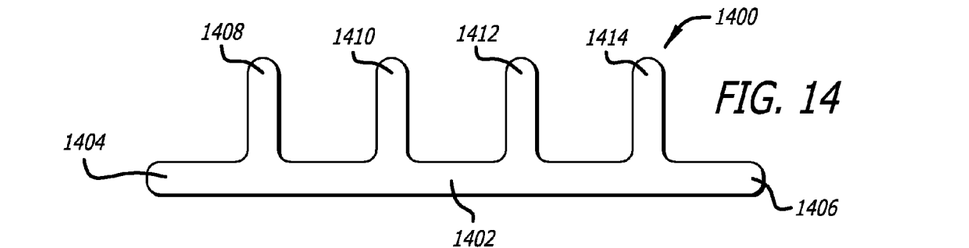
FIG. 14 illustrates another flexible securing device according to the present description wherein the elongated body member has appendages on only one side.

In still another embodiment, securing device 1400 includes elongated body member 1402 having a first end 1404 and a second end 1406. Between first end 1404 and second end 1406, at least three or more appendages protrude from and perpendicular to elongated body member 1402. In FIG. 14, securing device 1400 includes first appendage 1408, second appendage 1410, third appendage 1412 and fourth appendage 1414. In one embodiment, the entirety of securing device 1400 is flexible and in other embodiments, portions are rigid.

Figure 15:
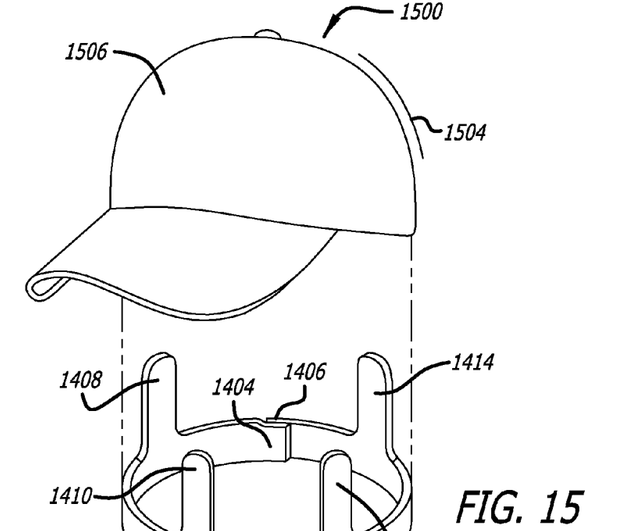
FIG. 15 illustrates the flexible securing device illustrated in FIG. 14 used to secure the shape of a baseball hat.

Securing device 1400 can be used for example to hold the form of a hat. Virtually any hat can be used with securing device 1400. One embodiment is illustrated in FIG. 15 wherein securing device 1400 is used to hold the form of baseball hat 1500. To use securing device 1400 in such an embodiment, first end 1410 and second end 1406 are joined forming elongated body member in a circular configuration. To properly size the diameter 1502 of circular configuration to fit within baseball hat 1500, first end 1404 and second end 1406 can be overlapped to reduce diameter 1502. First appendage 1408, second appendage 1410, third appendage 1412 and fourth appendage 1414 can all be bent inward to conform to the concave shape 1504 of baseball hat dome 1506.

Figure 16:
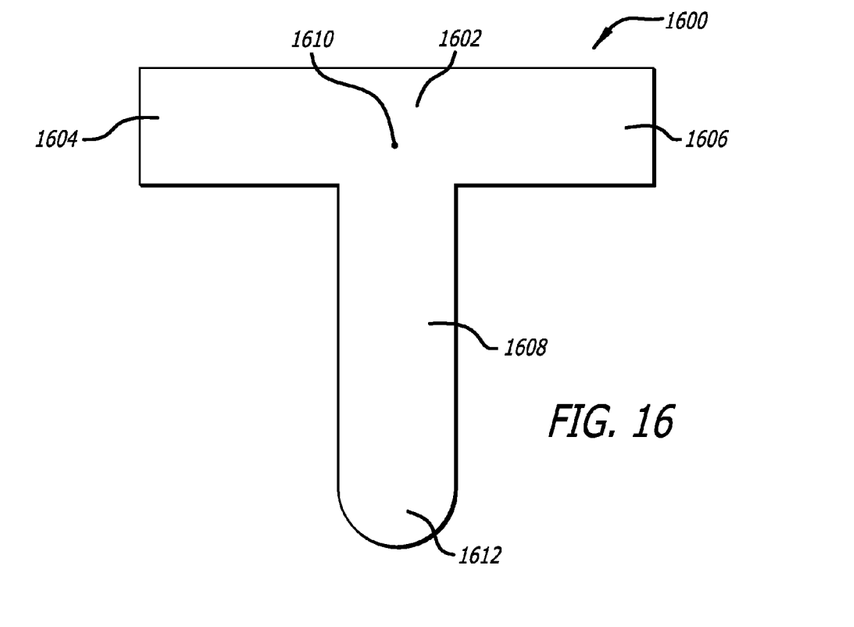
FIG. 16 illustrates another flexible securing device according to the present description wherein the elongated body member has one appendage on one side of elongated body member.
Figure 17:
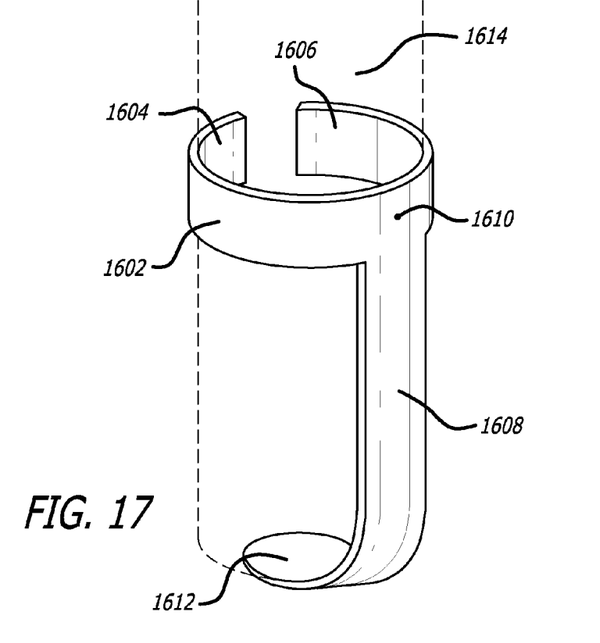
FIG. 17 illustrates the flexible securing device illustrated in FIG. 16 used to adjust a table's leg.

In another embodiment illustrated in FIGS. 16 and 17, securing device 1600 can be used to adjust a table leg to prevent a table from wobbling. Wobbling tables can be an ever irritating experience. Fold a paper napkin in a restaurant in an attempt to balance a wobbling table that would otherwise destroy the ambiance of a meal environment is an experience most people have had. Securing device 1600 has elongated body member 1602 which includes first end 1604 and second end 1606. First end 1604 and second end 1606 can be squared tapered or rounded. Securing device 1600 further includes appendage 1608 that originates at center point 1610 of elongated body member 1602. Endpoint 1612 of appendage 1608 can be rounded or squared depending on the shape of table leg 1614.

Securing device 1600 can be colored to match different wood finishes and colors. For example, cherry, cappuccino and back colors can be options for darker wood furniture while different shades of brown can be used for woods such as natural oak. Wood textures can also be imprinted onto securing device 1600. Additionally, securing device can be colored as appropriate depending on the exact color needed.

To use securing device 1600, first end 1604 and second end 1606 are bent around table leg 1614 whether it be a squared leg or rounded leg. Endpoint 1612 can be curled under the table leg to add height to the particular leg. If more height is required, securing device 1600 can be moved farther down table leg 1614 and endpoint 1612 can be bent back over itself thereby providing double thickness. The process can be repeated as necessary to add further height. If securing device 1600 is bent so many times that no further height can be added, a second securing device can be placed over the first one and the process repeated.

The securing devices described herein are generally made using a roll technique or a punch technique. In the roll technique, a roll of appropriate metal alloy is simply cut to a predetermined length, the edges are chamfered or otherwise dulled, and the metal alloy is subjected to a ribbon coating of polymer. After coating, the coated securing members are allowed to dry. In other embodiments the polymeric coating can be applied by dipping, spraying, vapor deposition, brushing, or the like. In some instances, to ensure that the metal alloy has been completely sealed within the polymeric coating, two ore more coats of polymer can be applied. Different combinations of coating techniques can be mixed and matched to achieve the correct coating thickness, consistency, and ruggedness.

In the punch technique, a sheet of metal alloy is punched using a punch press into one or more securing device shapes. It is conceivable that in some embodiments, hundreds of securing devices can be punched from a single sheet of metal alloy. After the shapes have been punched out, the securing device is coated with polymer using one of the methods described above.

In some embodiments, in order to make a metal more or less flexible (for example, to make it more rigid), the metal alloy can be heated and cooled any number of times to properly anneal the metal alloy. In other embodiments, the metals can be chilled several times to alter the properties of the metal alloys.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

We claim:

1. A flexible securing device comprising:
a metal body including a single piece of metal having a first appendage, a second appendage, and a third appendage, wherein the metal body further includes a first side having a first magnetic charge and a second side having a second magnetic charge, wherein the first magnetic charge and the second magnetic charge are configured to attract to each other, wherein the first appendage and the second appendage and are located at the opposite end of the metal body from the third appendage, wherein the first appendage and the second appendage reside adjacent to each other and extend in parallel directions, wherein the metal body is at least partially formed of a bendable metal alloy, and wherein the metal body is covered with a coating material.

2. The flexible securing device according to claim 1, wherein the first magnetic charge the second magnetic charge are opposite.

3. The flexible securing device according to claim 2, wherein the first side and the second side are coupled thereby securing the flexible securing device to an external object.

4. The flexible securing device according to claim 1, wherein the bendable metal alloy portion of the body secures an external object.

5. The flexible securing device according to claim 1, wherein the coating material is a polymeric material, a natural fabric or a synthetic fabric.

6. The flexible securing device according to claim 1, wherein the body is elongated having a first end and a second end wherein the body comprises the first, second or third appendage protruding on at least one side of the body between the first end and the second end.

7. The flexible securing device according to claim 1, wherein the first appendage and the second appendage are configured to secure the flexible securing device to an external object and the third appendage is configured to attach to a holiday light strand.

8. The flexible securing device according to claim 1, wherein the first appendage and the second appendage are configured to secure the flexible securing device to a furniture leg by wrapping the first appendage and the second appendage around the furniture leg and the third appendage is configured to at least partially curl under the furniture leg to add height to the furniture leg.

9. A flexible securing device comprising:
a body formed of a bendable metal alloy comprising a first side having a first magnetic charge and a second side having a second magnetic charge, wherein the first magnetic charge and the second magnetic charge attract each other, wherein the body has at least a first appendage and a second appendage at the first end of the body wherein the first appendage and the second appendage reside adjacent to each other and extend in parallel directions, and wherein the metal alloy is coated with a non-degradable polymeric material by dipping spraying, vapor deposition, brushing, or a combination thereof.

* * * * *